Patented Aug. 9, 1949

UNITED STATES PATENT OFFICE 2,478,441

VINYL PHOSPHONOCARBOXYLATE ESTERS AND POLYMERS THEREOF

Richard Haven Wiley, Wilmington, Del., assignor to E. I. du Pont de Nemours & Company, Wilmington, Del., a corporation of Delaware No Drawing. Application April 3, 1945, Serial No. 586,453

23 Claims. (Cl. 260—85.7)

This invention relates to new organic compounds of phosphorus. More particularly, it relates to new phosphonic acid derivatives. Still more particularly, it relates to new esters of phosphono carboxylic acids.

An object of this invention is to make available a new class of organic compounds, the diesters of vinyl phosphonocarboxylates. Another object is to provide a process for preparing these new esters. A further object is to provide polymers and copolymers of the diesters of vinyl phosphonocarboxylates. Other objects will appear hereinafter.

These objects are accomplished by the invention of vinyl esters of organic carboxylic acids having, on a saturated aliphatic carbon atom, alpha or beta to the carboxyl, a diesterified phosphono group, their polymers and copolymers with other polymerizable monoethylenic compounds. The invention also includes the processes whereby the monomers and polymers are obtained and therefore the process which comprises reacting a triester of phosphorous acid with a vinyl ester of an alpha- or beta-halogen, saturated, monocarboxylic acid and isolating the diester of the vinyl phosphonocarboxylate so obtained.

The products of this invention are vinyl carboxylates having a diesterified phosphono group on a saturated aliphatic carbon atom, preferably acyclic, said carbon atom being alpha or beta to the carboxyl. The esterification of the phosphono, $(HO)_2OP—$, group is by means of monovalent hydrocarbon radicals, preferably alkyl. The bivalent radical separating the vinyl-esterified carboxyl group and the diesterified phosphono group is preferably acyclic hydrocarbon.

The reaction leading to these products is illustrated by the following equation, which represents the formation of the diethyl ester of vinyl phosphonoacetate from triethyl phosphite and vinyl chloroacetate:

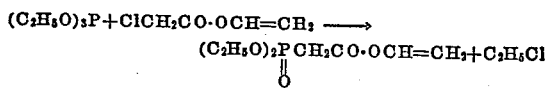

The invention is illustrated by the following examples which describe the preparation of a representative member of the class of diesters of vinyl alpha-phosphonocarboxylates and its polymerization and copolymerization with other polymerizable compounds. Parts are by weight unless otherwise indicated.

Example I

A mixture of 124 parts of vinyl chloroacetate, 166 parts of triethyl phosphite and one part of hydroquinone is heated to an initial temperature of 126° C., which is raised gradually to 157° C. in a period of 1½ hours, during which ethyl chloride is evolved. The resulting residue is fractionated under reduced pressure and the fraction boiling at 115–132° C. at 4 mm. pressure (139 parts, 62% yield) is collected. On refractionation, there is obtained 120 parts of vinyl diethylphosphonoacetate boiling at 117–119° C. at 2.5 mm. pressure and having a refractive index $N_D^{24.3}=1.4431$ and a specific gravity $d_{25}=1.1370$.

Analyses: Calculated for $C_8H_{15}O_5P$: C, 42.5%; H, 6.75%; P, 13.95%; molecular weight, 222; iodine number, 114; saponification number, 505. Found: C, 43.2%; H, 6.9%; P, 13.7%; molecular weight, 231; iodine number, 113; saponification number, 526.

The product is a colorless liquid, soluble in water and in organic solvents such as benzene, alcohol, acetone and carbon tetrachloride.

Example II

A sample of vinyl diethylphosphonoacetate containing one per cent by weight of benzoyl peroxide is heated at 65° C. in an atmosphere of deoxidized nitrogen following a few minutes' agitation to dissolve the catalyst. The monomeric ester becomes viscous after one hour's heating. At the end of ten hours, it has polymerized to a waxy solid, insoluble in water and benzene but still soluble in hot alcohol. The polymer has a molecular weight of about 1300 as determined ebullioscopically in alcohol. Analysis indicates the presence of 13.23% phosphorus (calculated: 13.95%); the iodine number has decreased to 25.5 as compared to the calculated value of 114 for the monomer. Similar products of varying molecular weight are obtained by carrying out the polymerization at temperatures varying between 60 and 95° C.

Other polymerization catalysts and polymerization conditions may be used, as exemplified in the following experiments:

(a) To a solution of ten parts of vinyl diethylphosphonoacetate in 26 parts of thiophene-free benzene is added 0.1 part of a 50% solution of diethyl peroxide in benzene. The mixture is sealed in a glass tube previously swept with nitrogen, and heated at 125° C. for 8 hours. Upon removal of the benzene by evaporation, there is left a viscous liquid polymer having a molecular weight of about 650, as determined ebullioscopically in ethanol.

(b) One part of a solution of one part of anhydrous aluminum chloride in 15 parts of absolute ether is added to one part of vinyl diethylphosphonoacetate and the mixture is heated at 65° C. in a closed vessel. After half an hour the monomeric ester has polymerized to an opaque, white, wax-like solid incompletely soluble in ether.

(c) To a solution of ten parts of vinyl diethylphosphonoacetate in 20 parts of water is added ten parts of ammonium persulfate, 0.02 part of sodium bisulfite and 0.6 part of white oil sodium sulfonate as emulsifying agent, and the mixture is stirred at 40° C. for six hours. At the end of this time, a milky suspension has formed which, on standing, separates into two layers. The lower layer is a viscous, oil-like polymer of vinyl diethylphosphonoacetate.

*Example III*

A mixture of 75% by weight of styrene and 25% by weight of vinyl diethylphosphonoacetate, the mixture containing one per cent of benzoyl peroxide as polymerization catalyst, is heated for three hours at 50° C. in an atmosphere of deoxidized nitrogen. At the end of this time, the product is a translucent, solid copolymer of styrene and vinyl diethylphosphonoacetate which can be formed into transparent sheets.

When styrene is replaced by an equal weight of vinyl acetate, other conditions being the same, the copolymer is a clear, viscous liquid still soluble in organic solvents such as acetone.

*Example IV*

Copolymers of vinyl diethylphosphonoacetate and methyl methacrylate are prepared by heating at 65° C. in an atmosphere of deoxidized nitrogen mixtures containing methyl methacrylate monomer in amounts varying from 15% to 95% by weight, the balance being monomeric vinyl diethylphosphonoacetate. In all cases, one per cent by weight of benzoyl peroxide is added as the polymerization catalyst. The copolymers containing low proportions of methyl methacrylate (up to 25–35%) are soft, translucent, waxy solids. Those containing high proportions of methyl methacrylate (75–95%) are clear solids which can be readily molded into transparent sheets. The polymer formed from the 75/25 mixtures of methyl methacrylate and vinyl diethylphosphonoacetate contains 3.44% phosphorus, has a sticking point of 55–60° C. and a softening point somewhat below that of unmodified methyl methacrylate. A molded film made from this material is softer and more pliable than unmodified methyl methacrylate film. The film is self-extinguishing; that is, it burns in a flame but ceases to burn when the flame is withdrawn, whereas unmodified methyl methacrylate continues to burn.

*Example V*

An aqueous emulsion polymerization system is prepared by adding, to 96.1 parts of water, 0.25 part of ammonium persulfate, 0.07 part of sodium bisulfite and 3.6 parts of white oil sodium sulfonate (42% active ingredient) as the emulsifying agent, and adjusting the pH to 6.0 by addition of dilute sodium hydroxide. To this system is added 50 parts of a monomer mixture of 95 parts of vinyl chloride and 5 parts of vinyl diethylphosphonoacetate and the resulting emulsion is heated in a sealed vessel with agitation at 35° C. for 16 hours. The polymer latex thus obtained is steam, coagulated with brine, washed with water and dried. A 94% yield of copolymer is obtained.

Under exactly the same conditions, two other monomer mixtures of vinyl chloride and vinyl diethylphosphonoacetate in the ratios 90/10 and 80/20, respectively, are polymerized. All three copolymers are soluble in methyl ethyl ketone and cyclohexanone. They can be molded to tough, translucent films. Some of their properties are tabulated below:

| Ratio of vinyl chloride to vinyl diethylphosphonoacetate | Phosphorus, per cent | Softening point, °C. | Viscosity, poises |
|---|---|---|---|
| 95/5 | 0.6 | 82 | 10.7 |
| 90/10 |  | 75 | 3.7 |
| 80/20 | 2.4 | 68 | 6.23 |

The 80/20 copolymer, when coated onto a fabric, gives a coating with a lower cold crack, a higher mar point and less tack than a coating made from a commercial vinyl chloride/vinyl acetate copolymer. Furthermore, the coated fabric is considerably more resistant to ignition and burning.

In the above table, the viscosities are measured in Gardner-Holdt tubes in 10% solutions in cyclohexanone. The softening temperatures are determined as described in Example I of application Ser. No. 479,894, now U. S. Patent No. 2,450,000, filed March 20, 1943, by Howk and Johnston.

*Example VI*

A solution of 30 parts of vinyl diethylphosphonoacetate in 89 parts of benzene containing 0.2 part of benzoyl peroxide is subjected to an ethylene pressure of 1000 atm. at 75° C. for 10 hours. Removal of the benzene leaves a waxy solid which is extracted with hot alcohol. The product after extraction contains 66% carbon, 10.5% hydrogen and 5.7% phosphorus, which corresponds to a mol ratio of 11.5 of ethylene to one of vinyl diethylphosphonoacetate, or to 40.8% by weight of the latter ingredient in the copolymer. The copolymer melts readily in a free flame but it does not ignite and burn as does an unmodified ethylene polymer.

*Example VII*

A mixture of 20 parts of vinyl diethylphosphonoacetate, 80 parts of tetrafluoroethylene, 100 parts of water and 1 part of benzoyl peroxide is subjected to a pressure of 4000 lbs./sq. in. at 80° C. by water injection for one hour. At the end of this time the reaction mixture contains 24 parts of a wax-like polymer which is separated and washed with alcohol. The product contains 3.6% of phosphorus, which corresponds to a mol ratio of 3.6 of tetrafluoroethylene to one of vinyl diethylphosphonoacetate.

The invention has been described with particular reference to vinyl diethylphosphonoacetate, since this compound is a typical representative of the class of diesters of vinyl phosphonocarboxylates having the diesterified phosphono group on an alpha or beta carbon. The invention is however generic to vinyl carboxylates having, on a carbon alpha or beta to the carboxyl group, a diesterified phosphono group and to polymers, including copolymers, of such vinyl esters. The novel products of the present invention may be described as of the formula

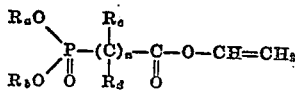

wherein $R_a$ and $R_b$ are monovalent hydrocarbon radicals preferably alkyl, $R_c$ and $R_d$ are hydrogen or monovalent saturated hydrocarbon radicals, preferably alkyl, and $n$ is 1 or 2. The preferred products, which are the diesters of vinyl alpha-phosphonocarboxylates, have the general formula

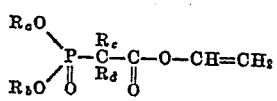

wherein $R_a$ and $R_b$ are monovalent hydrocarbon radicals, preferably alkyl, and $R_c$ and $R_d$ are hydrogen or monovalent saturated hydrocarbon radicals, preferably alkyl.

Illustrative esters of my invention, included within my generic invention, are the following: vinyl alpha-(dimethylphosphono)propionate, vinyl alpha-(dipropylphosphono)-butyrate, vinyl alpha-(diethylphosphono)stearate, vinyl alpha-phenyl-alpha-(dimethylphosphono)acetate, vinyl alpha-cyclo-hexyl-alpha-(dicyclohexylphosphono)acetate, vinyl beta-(dibutylphosphono)-propionate, vinyl beta-(diphenylphosphono)-butyrate, vinyl beta-phenyl-beta-(dibenzylphosphono)propionate, etc. In the preparation of the monomeric esters, there may be used other esters of phosphorous acid besides triethyl phosphite, among which may be mentioned trimethyl phosphite, tricyclohexyl phosphite, tribenzyl phosphite, triphenyl phosphite, etc. Mixed esters may be used. The trialkyl phosphites, particularly the lower alkyl esters having up to six carbons in the alkyl group, are preferred. In addition to vinyl chloroacetate, other vinyl alpha- or beta-halogeno esters may be used, e. g., vinyl alpha-bromopropionate, vinyl alpha-iodobutyrate, vinyl alpha-bromostearate, vinyl alpha-chloro-alpha-phenylacetate, vinyl alpha-chloro-alpha-cyclohexylacetate, vinyl beta-iodopropionate, vinyl beta-chloro-butyrate, vinyl beta-chloro-beta-phenylpropionate, etc. The vinyl esters of saturated aliphatic alpha-halogeno monocarboxylic acids having up to six carbons are preferred, in particular those in which the halogen atom is of atomic weight between 20 and 80, i. e. chlorine or bromine, because they are cheaper, more readily available, lend themselves particularly well to reaction and yield the correspondingly preferred vinyl dialkylphosphonocarboxylates.

The condensation between the triester of phosphorous acid and the vinyl halogenocarboxylate may be carried out at any temperature, up to the decomposition point of the reactants, which permits a suitable rate of reaction. In general, this is above 50° C., preferably between 100 and 200° C. It is convenient to remove the by-product alkyl halide as it forms, but the reaction may also be carried out in a closed vessel under pressure, bleeding off the alkyl halide if desired. In general, no solvent is necessary, but a solvent or diluent may be used (e. g. benzene, ethyl acetate, etc.), particularly if the reaction tends to be sluggish. It is best to use approximately equivalent amounts of the reactants, though an excess of one or the other does no harm. In particular, an excess of the vinyl halogenocarboxylate may be desirable in closed systems to prevent side reaction with the alkyl halide. The diester of vinyl phosphonocarboxylate is conveniently isolated by fractional distillation, or by crystallization if it is a solid.

The diesters of vinyl phosphonocarboxylates are polymerizable per se to polymers which vary, depending upon the nature of the monomer and the degree of polymerization, from viscous liquids to waxy solids. They are also copolymerizable with other polymerizable monoethylenic compounds, among which may be mentioned, in addition to those illustrated in the examples, isobutylene, vinylidene chloride, acrylonitrile, methyl acrylate, methacrylamide, maleic anhydride, ethyl fumarate, ethyl maleate, vinyl phthalimide, etc. Of the copolymerizable monoethylenic materials, the most useful ones are those having a terminal carbon to carbon ethylenic double bond, in particular the vinyl and vinylidene compounds, i. e., the compounds having the terminal groups $CH_2=CH-$ or $CH_2=C<$ where the free valences are satisfied by hydrogen, hydrocarbon, halogen, ester, carboxyl, carbalkoxyl etc. groups. The copolymers may contain any desired amount of the vinyl phosphonocarboxylate, e. g., between 2% and 95%, although at least 5% is required for a significant improvement in combustion retarding properties. Preferably there should be at least 50% of the other comonomer to retain its properties in the copolymer, hence a range between 5% and 50% of the vinyl phosphonocarboxylate is preferred.

The polymerization or copolymerization of the diesters of vinyl phosphonocarboxylates may be carried out in the absence of a catalyst, e. g. by means of heat or ultra-violet light. Preferably, one of the usual polymerization catalysts is used, such as those mentioned in the examples, to which may be added boron trifluoride, zinc chloride, acetyl peroxide, etc. The most useful of these catalysts are the peroxy compounds.

Polymerization and copolymerization may be carried out in bulk, in organic solvents or diluents, or in aqueous emulsions.

The polymers and copolymers of the diesters of vinyl phosphonocarboxylates are of interest as coating and impregnating agents, in particular for textile materials such as cotton and rayon fabrics which are rendered fire-resistant. In these applications, the preformed polymers or copolymers may be used, or the monomer or comonomer mixtures may be polymerized in situ. Films and shaped articles of improved fire resistance may be made from the polymers or copolymers. They are also of interest as plasticizers particularly for cellulose derivatives. The monomeric esters are useful as stabilizers for lubricating oils, antioxidants, insecticides and surface active agents.

The above description and examples are intended to be illustrative only. Any modification thereof or variation therefrom which conforms to the spirit of the invention is intended to be included within the scope of the claims.

What is claimed is:
1. Vinyl diethylphosphonoacetate,

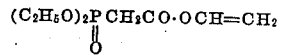

2. A polymer of vinyl diethylphosphonoacetate.
3. An interpolymer of 2 to 95% of vinyl diethylphosphonoacetate, the remainder being another polymerizable compound containing one olefinic linkage.

4. An interpolymer of 2 to 95% of vinyl diethylphosphonoacetate, the remainder being another polymerizable compound containing one $CH_2=C=$ group.

5. A vinyl ester of the formula

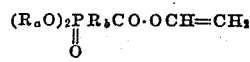

wherein $R_a$ is an alkyl group of 1 to 6 carbons, $R_b$ is a bivalent saturated aliphatic hydrocarbon radical having its free valences separated by from one to two carbons.

6. A polymer of the ester of claim 5.

7. An interpolymer of 2 to 95% of the ester of claim 5, the remainder being another polymerizable compound containing one $CH_2=C=$ group.

8. An ester of an acid of the formula

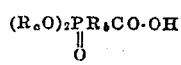

wherein $R_a$ is a monovalent hydrocarbon radical selected from the group consisting of lower alkyl, mononuclear cycloalkyl, mononuclear aryl hydrocarbon and mononuclear alkaryl hydrocarbon radicals and $R_b$ is a bivalent saturated aliphatic hydrocarbon radical having its free valences separated by from one to two carbons said ester being selected from the class consisting of vinyl esters and polymers of said esters.

9. Process of making a vinyl ester of a carboxylic acid having, on a saturated aliphatic carbon not more than once removed from the carboxyl group, a diesterified phosphono group which comprises reacting, at 50-200° C., a vinyl ester of a carboxylic acid having, as its sole reactive substituent and that on a carbon in a position selected from the alpha and beta positions, a halogen, with a triester of phosphorous acid wherein the acid hydrogens are replaced by monovalent hydrocarbon radicals selected from the group consisting of lower alkyl, mononuclear cycloalkyl, mononuclear aryl hydrocarbon and mononuclear alkaryl hydrocarbon radicals.

10. Process of making vinyl diethylphosphonoacetate which comprises reacting, at 50-200° C., vinyl chloroacetate with triethyl phosphite.

11. Process of making vinyl diethylphosphonoacetate which comprises reacting vinyl chloroacetate with triethyl phosphite in an inert solvent at 50-200° C.

12. Process of making a polymer from a vinyl ester of a carboxylic acid having, separated from the carboxyl by a bivalent saturated aliphatic hydrocarbon radical and not more than one carbon removed from said carboxyl, a diesterified phosphono group in which the radicals replacing the acid hydrogens of the phosphono group are monovalent hydrocarbon radicals selected from the group consisting of lower alkyl, mononuclear cycloalkyl, mononuclear aryl hydrocarbon and mononuclear alkaryl hydrocarbon radicals which comprises exposing the monomer to polymerizing conditions preferably in the presence of a polymerization catalyst, e. g., a peroxygen compound catalyst.

13. Process of claim 12 wherein 2 to 90 parts of the monomer is copolymerized with 98 to 5 parts of another polymerizable compound containing a single ethylenic linkage.

14. Process of claim 12 wherein 2 to 95 parts of the monomer is copolymerized with 98 to 5 parts of another polymerizable compound having one $CH_2=C=$ linkage.

15. A coated fabric comprising a textile fabric having a coating thereon of a polymer of a vinyl ester of an organic carboxylic acid having a diesterified phosphono group separated by a bivalent saturated aliphatic hydrocarbon radical from the carboxyl and not more than one carbon removed from said carboxyl, the phosphono group having the acid hydrogens replaced by monovalent hydrocarbon radicals selected from the group consisting of lower alkyl, mononuclear cycloalkyl, mononuclear aryl hydrocarbon and mononuclear alkaryl hydrocarbon radicals.

16. A coated fabric comprising a textile fabric having a coating thereon of a copolymer of 2 to 95% vinyl diethylphosphonoacetate, the remainder being vinyl chloride.

17. A vinyl ester of the formula

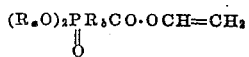

wherein $R_a$ is a monovalent hydrocarbon radical selected from the group consisting of lower alkyl, mononuclear cycloalkyl, mononuclear aryl hydrocarbon and mononuclear alkaryl hydrocarbon radicals and $R_b$ is a bivalent saturated aliphatic hydrocarbon radical having its free valences separated by from one to two carbons.

18. An interpolymer of 5 to 95 parts vinyl diethylphosphonoacetate with 5 to 95 parts of another polymerizable compound containing one $CH_2=<$ group.

19. An interpolymer of 5 to 95 parts of the ester of claim 5 with 5 to 95 parts of another polymerizable compound containing one $CH_2=C<$ group.

20. Process of making a polymer from a monomeric vinyl ester of a carboxylic acid having, on a saturated carbon in the position selected from the group consisting of the positions alpha and beta with respect to the carboxyl, a

group wherein R is an alkyl of one to six carbons, which comprises bringing the monomeric ester in contact with an addition polymerization catalyst at a temperature of 35-125° C.

21. Process of making a vinyl ester of a carboxylic acid having, on a saturated aliphatic carbon not more than once removed from the carboxyl group, a diesterified phosphono group which comprises reacting a vinyl ester of a carboxylic acid having, as its sole reactive substituent and that on carbon not more than one carbon removed from the carboxyl group, a halogen of atomic weight between 20 and 80 with a trialkyl phosphite.

22. Process of making a vinyl ester of a carboxylic acid having, on a saturated aliphatic carbon not more than once removed from the carboxyl group, a diesterified phosphono group which comprises reacting a vinyl ester of a carboxylic acid having, as its sole reactive substituent and that on carbon not more than one carbon removed from the carboxyl group, a halogen of atomic weight between 20 and 80 with a trialkyl phosphite wherein the alkyl groups are from one to six carbon atoms.

23. An interpolymer of 2 to 95% of the ester of claim 17, the remainder being another polymerizable compound containing one $CH_2=C=$ group.

RICHARD HAVEN WILEY.

(References on following page)

REFERENCES CITED

The following references are of record in the file of this patent:

UNITED STATES PATENTS

| Number | Name | Date |
|---|---|---|
| 1,241,738 | Klatte et al. | Oct. 7, 1917 |
| 2,268,158 | Marvel | Dec. 30, 1941 |
| 2,342,785 | Bock et al. | Feb. 29, 1944 |
| 2,389,576 | Kosolapoff | Nov. 20, 1945 |

OTHER REFERENCES

Arbuzov et al. (II), "Chemical Abstracts," vol. 30 (1936), cols. 4813–14.

Myer et al.: "Lehrbuch der Organischen Chemie" (2nd ed., 1907), vol. 1, page 564.

Arbuzov et al.: "Chem. Abstracts," vol. 8, pages 2551–2552 (1914), abstracting original publication in J. Russ. Phys. Chem. Soc. 46, 295–302.

Beilstein: Handbuch der Organischen Chemie, vol. 4, pages 573 (1929).

---

Certificate of Correction

Patent No. 2,478,441                 August 9, 1949

RICHARD HAVEN WILEY

It is hereby certified that errors appear in the printed specification of the above numbered patent requiring correction as follows:

Column 7, line 68, for "2 to 90 parts" read *2 to 95 parts*; column 8, line 31, for "$CH_2=<$" read *$CH_2=C=$*; line 34, for "$CH_2=C<$" read *$CH_2=C=$*;

and that the said Letters Patent should be read with these corrections therein that the same may conform to the record of the case in the Patent Office.

Signed and sealed this 21st day of February, A. D. 1950.

[SEAL]

THOMAS F. MURPHY,
*Assistant Commissioner of Patents.*